US010487662B2

(12) United States Patent
Dahl et al.

(10) Patent No.: US 10,487,662 B2
(45) Date of Patent: Nov. 26, 2019

(54) WIND TURBINE BLADE COMPRISING METAL FIBRES AND A TRANSITION REGION

(75) Inventors: Martin Dahl, Flensburg (DE); Bjarne Krab Mortensen, Billund (DK); Benjamin Hornblow, Copenhagen Ø (DK)

(73) Assignee: LM WP PATENT HOLDING A/S, Kolding (DK)

( * ) Notice: Subject to any disclaimer, the term of this patent is extended or adjusted under 35 U.S.C. 154(b) by 1586 days.

(21) Appl. No.: 14/111,039

(22) PCT Filed: Apr. 11, 2012

(86) PCT No.: PCT/EP2012/056521
§ 371 (c)(1),
(2), (4) Date: Oct. 10, 2013

(87) PCT Pub. No.: WO2012/140041
PCT Pub. Date: Oct. 18, 2012

(65) Prior Publication Data
US 2014/0037455 A1    Feb. 6, 2014

(30) Foreign Application Priority Data
Apr. 11, 2011  (EP) .................................... 11161889

(51) Int. Cl.
*F03D 1/06*  (2006.01)
*F01D 5/14*  (2006.01)
*F01D 5/12*  (2006.01)

(52) U.S. Cl.
CPC .............. *F01D 5/147* (2013.01); *F01D 5/12* (2013.01); *F03D 1/0675* (2013.01);
(Continued)

(58) Field of Classification Search
CPC ... F01D 5/12; F01D 5/14; F01D 5/147; F01D 5/28; F01D 5/282; F03D 1/065;
(Continued)

(56) References Cited

U.S. PATENT DOCUMENTS 7,364,407 B2 * 4/2008 Grabau .................. F03D 1/065
                                                  416/229 R
7,427,189 B2 * 9/2008 Eyb ......................... F03D 1/065
                                                  416/226
(Continued)

FOREIGN PATENT DOCUMENTS

EP   2 153 964 A1   2/2010
GB   2 451 192 A    1/2009
(Continued)

OTHER PUBLICATIONS

Internet print-out of http://www.clearwatercomposites.com/resources/Properties-of-carbon-fiber.*

*Primary Examiner* — Woody A Lee, Jr.
*Assistant Examiner* — Christopher R Legendre
(74) *Attorney, Agent, or Firm* — Nath, Goldberg & Meyer; Jerald L. Meyer; Tanya E. Harkins

(57) ABSTRACT

A wind turbine blade 2 for a rotor has a longitudinal direction extending from a root region 26 to a blade region. The wind turbine blade 2 is formed of a fibre-reinforced polymer material comprising a polymer matrix and a first and a second reinforcement fibre material being embedded in the polymer matrix. The wind turbine blade further comprises a first region being reinforced predominantly with the first reinforcement fibre material, a second region being reinforced predominantly with the second reinforcement fibre material, and a transition region between the first and the second region. The first region extends in the root region 26 and the first reinforcement fibre material is a metal.

15 Claims, 4 Drawing Sheets

(52) U.S. Cl.
CPC ............... *F05B 2280/5001* (2013.01); *F05B 2280/6003* (2013.01); *F05B 2280/702* (2013.01); *Y02E 10/721* (2013.01)

(58) Field of Classification Search
CPC .... F03D 1/0675; F03D 3/062; F05B 2240/21; F05B 2240/221; F05B 2240/2212; F05B 2240/231; F05B 2240/30; F05B 2240/301; F05B 2240/302; F05B 2280/6003; F05B 2280/702
See application file for complete search history.

(56) References Cited

U.S. PATENT DOCUMENTS

| | | | | |
|---|---|---|---|---|
| 7,438,533 | B2 * | 10/2008 | Eyb | F03D 1/0658 416/230 |
| 7,521,105 | B2 * | 4/2009 | Bech | B29C 66/1162 416/229 R |
| 7,802,968 | B2 * | 9/2010 | Jacobsen | F03D 1/065 416/226 |
| 7,988,423 | B2 * | 8/2011 | Hancock | F03D 1/0675 416/226 |
| 8,066,490 | B2 * | 11/2011 | Babu | F03D 1/0658 416/209 |
| 8,105,040 | B2 * | 1/2012 | Vronsky | F03D 1/0658 416/204 R |
| 8,250,761 | B2 * | 8/2012 | Tobin | B29D 99/0025 29/889.7 |
| 8,348,622 | B2 * | 1/2013 | Bech | B29C 66/20 416/223 R |
| 8,408,875 | B2 * | 4/2013 | Quell | F03D 1/0658 416/204 R |
| 8,545,182 | B2 * | 10/2013 | Sorensen | F03D 1/0658 416/204 R |
| 8,734,110 | B2 * | 5/2014 | Kuroiwa | F03D 11/0033 416/146 R |
| 8,807,952 | B2 * | 8/2014 | Drewes | F03D 1/0675 416/224 |
| 9,181,923 | B2 * | 11/2015 | Grabau | B29C 33/12 |
| 2010/0290912 | A1 * | 11/2010 | Sorensen | F03D 1/0658 416/204 R |
| 2014/0037455 | A1 * | 2/2014 | Dahl; Martin | F03D 1/0675 416/223 R |
| 2014/0154092 | A1 * | 6/2014 | Dahl | F03D 1/0675 416/229 R |
| 2015/0010406 | A1 * | 1/2015 | Torgard | B23P 15/04 416/230 |

FOREIGN PATENT DOCUMENTS

| | | |
|---|---|---|
| WO | 03/078832 A1 | 9/2003 |
| WO | 2010/018225 A2 | 2/2010 |
| WO | 2011/144428 A1 | 11/2011 |

* cited by examiner

WIND TURBINE BLADE COMPRISING METAL FIBRES AND A TRANSITION REGION

This is a National Phase Application filed under 35 U.S.C. 371 as a national stage of PCT/EP2012/056521, filed 11 Apr. 2012, claiming priority from European Application No. 11161889.8, filed Apr. 11, 2011, the content of each of which is hereby incorporated by reference in its entirety.

TECHNICAL FIELD

The present invention relates to a wind turbine blade for a rotor having a substantially horizontal rotor shaft, the rotor comprising a hub from which the wind turbine blade extends substantially in a radial direction when mounted to the hub, the wind turbine blade having a longitudinal direction extending from a root region to a blade region, the root and the blade region, respectively, being closest to and furthest away from the hub when the wind turbine blade is mounted to the hub, the root region having a substantially circular profile, the wind turbine blade being formed of a fibre-reinforced polymer material comprising a polymer matrix and a first and a second reinforcement fibre material being embedded in the polymer matrix, the wind turbine blade further comprising a first region, a second region and a transition region between the first and the second region, the first region, the second region and the transition region extending in the longitudinal direction, the first region being predominantly reinforced with the first reinforcement fibre material, the second region being predominantly reinforced with the second reinforcement fibre material, the first and the second reinforcement fibre material being different from each other having different E-modulus and material properties such as stiffness and elongation at breakage, the transition region having a gradually changing distribution of the first and the second reinforcement fibre material in the longitudinal direction.

BACKGROUND ART

Horizontal axis wind turbines comprise a rotor provided with a number of wind turbine blades—often two or three—which extend radially from a hub. The wind turbine blades have a profile transversely to the longitudinal or radial direction of the wind turbine blades. The wind turbine blades comprise a root region with a substantially circular profile closest to the hub, a blade region, also named airfoil region, with a lift-generating profile furthest away from the hub, and optionally a transition region between the root region and the blade region, the profile of the transition region changing gradually in the radial direction from the circular profile of the root region to the lift-generating profile of the blade region. The lift-generating profile is provided with a suction side and a pressure side as well as a leading edge and a trailing edge. The root region has a root end surface comprising a number of bores arranged in the proximity of the circumference of the substantially circular profile and extending from the root end surface into the root region. The bores each has an inner thread for receiving a fastening means, such as a bolt, from the hub when the wind turbine blade is mounted to the hub. As the demand for more powerful wind turbines, e.g. longer wind turbine blades, is increasing and the demand for more cost-effective wind turbines is increasing at the same time, it has proved difficult to provide wind turbine blades having sufficient structural strength and utilising the material optimally. This applies especially to the root region, which is critical for a secure fastening of the wind turbine blade to the hub during use of the wind turbine.

WO 2010/018225 provides a method of manufacturing a wind turbine blade comprising a steel wire or steel fibre-reinforced polymer matrix. However, the document does not address the problem of how the root region is to be designed to withstand extreme loads in the connection between the blade root and the hub.

WO 03/078832 discloses a wind turbine blade comprising a longitudinally extending transition region, in which the ratio between two types of fibres, e.g. glass and carbon fibres, gradually changes in order to obtain a smooth transition in stiffness in the longitudinal direction of the blade.

GB 2 451 192 describes a wind turbine blade comprising a spar box and a blade shell. The spar box comprises a reinforcement material inlcuding two or more different types of carbon fibres. The proportion between the at least two types of carbon varies in the longitudinal direction so that the elastic modulus of the fibrous composite material increases towards the tip. Further, the blade shell may comprise other types of fibres extending along the entire longitudinal extent of the blade. Metallic fibres such as steel fibres are mentioned as a possibility.

DISCLOSURE OF THE INVENTION

It is an object of the invention to provide a new structure of a wind turbine blade, which overcomes at least one of the disadvantages of the prior art or at least provides a useful alternative.

The object of the invention is obtained in that the first region extends in the root region and in that the first reinforcement fibre material is a metal. Hereby, a wind turbine blade, which is ideal for a large wind turbine, is provided by combining a first reinforcement fibre material being metal located in the root region with a second reinforcement fibre material being a different material with different properties. Thus, a long wind turbine blade, e.g. longer than 40 meters, can be equipped with a root region that has a relatively small diameter and bolt circle diameter, and at the same time has sufficient mechanical strength and flexibility. By providing a smaller root region diameter, the overall energy efficiency is increased due to an improved aerodynamic performance of the root region compared to a larger diameter root region that would be necessary conventionally. Another alternative is a shorter wind turbine blade. Thus, an optimum ratio between the length of the wind turbine blade and the root diameter is obtained. Further, the metal fibres, advantageously steel fibres, have material properties that are compatible with the fastening means, since these are typically made of metal and often steel.

By predominantly is meant that the first and/or second reinforcement fibre material comprises at least 50%, 60%, 70%, 80%, 90%, 95% or even 100% by volume or by mass of the reinforcement fibre in the root region. Preferably, the remaining reinforcement fibre, if any, is made of glass fibres and/or carbon fibres. Preferably, the first region extends from the root of the wind turbine blade. By distribution of the first and the second reinforcement fibre material is meant a quantitative ratio of the first and the second reinforcement fibre material. The distribution can be measured by volume or by mass.

The first region may extend beyond the root region and into the remaining part of the wind turbine blade. Thus, the first region may extend throughout the root region if the first region is extending from the root of the wind turbine blade, or the first region may extend only in a fraction of the root region if the first region is not extending from the root of the wind turbine blade. Thus, the first region may constitute at least 5%, 10%, 15%, 20%, 25%, 30%, 35%, 40%, 45%, 50%, 55%, 60%, 65%, 70%, 75%, 80%, 85%, 90%, 95% or even 100% of the length of the root region.

In another embodiment according to the invention, the first region extends fully in the root region. Hereby, a wind turbine blade is provided, wherein the first region is fully contained within the root region, i.e. the first region is only located in the root region. Thus, the first region does not extend beyond the root region. The first region may constitute at least 5%, 10%, 15%, 20%, 25%, 30%, 35%, 40%, 45%, 50%, 55%, 60%, 65%, 70%, 75%, 80%, 85%, 90%, 95% or even 100% of the length of the root region.

In another embodiment according to the invention, the transition region extends in the root region. Hereby, a wind turbine blade is provided, wherein at least a portion of the transition region extends in the root region. The transition region may extend beyond the root region and into the remaining part of the wind turbine blade. Thus, the first region is fully contained in the root region, and the entire first region and a fraction of the transition region constitute the root region together. The transition region may constitute at least 5%, 10%, 15%, 20%, 25%, 30%, 35%, 40%, 45%, 50%, 55%, 60%, 65%, 70%, 75%, 80%, 85%, 90% or even 95% of the length og the root region.

In another embodiment according to the invention, the transition region extends fully within the root region. Hereby, a wind turbine blade is provided, wherein the transition region is fully contained within the root region. Thus, the transition region does not extend beyond the root region. Thus, the first region and the transition region are fully contained in the root region, and the entire first region and transition region and a fraction of the second region in combination constitute the root region. The second region may constitute a maximum of 50%, 45%, 40%, 35%, 30%, 25%, 20%, 15%, 10% or even 5% of the length of the root region.

In another embodiment according to the invention, the second region extends in the root region. Hereby, a wind turbine blade is provided, wherein the second region extends beyond the root region and into the remaining part of the wind turbine blade. Thus, the first region is fully contained in the root region, and the entire first region and the transition region and a fraction of the second region in combination constitute the root region. The second region may constitute a maximum of 50%, 45%, 40%, 35%, 30%, 25%, 20%, 15%, 10% or even 5% of the length of the root region. Preferably, the second region extends beyond the root region, e.g. into the remaining wind turbine blade, even to the blade region.

In another embodiment according to the invention, the first reinforcement fibre material is steel. By using steel as the first reinforcement fibre material, a wind turbine blade is provided with a high mechanical strength in the root region, and the diameter of the root region can thus be kept relatively low. Preferably, the first reinforcement fibre material being steel is steel wires made of monofilaments having a maximal inner cross-sectional dimension in the range between 0.04 mm and 1 mm, or in the range between 0.07 and 0.75, or in the range between 0.1 mm and 0.5 mm. Preferably, the steel wires or monofilaments have a substantially circular or elliptical cross section. Accordingly, the maximal inner cross-sectional dimension corresponds to the diameter or major axis of the wires or monofilaments, preferably monofilaments. The steel wires may be coated or primed with e.g. zinc or brass. The steel wires are arranged substantially parallel to each other. Typically, steel has a Young's modulus of around 200 GPa, an elongation at breakage between 35% and 40% and a density 7.85 g/cm$^3$.

In another embodiment according to the invention, the second reinforcement fibre material is carbon. Hereby, a wind turbine blade is provided having a mechanical strength in combination with a low weight as typically, carbon has a Young's modulus of around 245 GPa, an elongation of breakage between 0.3% and 1.4% and a density around 1.75 g/cm$^3$. The carbon fibres are arranged substantially parallel to each other.

In another embodiment according to the invention, the second reinforcement fibre material is glass. Hereby, a wind turbine blade is provided having a mechanical strength in combination with a low weight as typically, glass has a Young's modulus of around 73 GPa, an elongation of breakage around 4.8% and a density around 2.54 g/cm$^3$. The glass fibres are arranged substantially parallel to each other.

In another embodiment according to the invention, the fibres of the first reinforcement fibre material extend predominantly in the longitudinal direction. Hereby, a wind turbine blade is provided with an optimum stiffness in the longitudinal direction by the first reinforcement fibre material being metal fibres arranged substantially in the longitudinal direction of the wind turbine blade. Preferably, the second reinforcement fibre material being glass or carbon fibres may also extend predominantly in the longitudinal direction.

In another embodiment according to the invention, the transition region extends at least half a meter in the longitudinal direction. The transition region may extend in at least 2%, 5%, 10%, 15%, 20%, 25%, 30%, 35%, 40%, 45%, 50%, 55%, 60%, 65%, 70%, 75%, 80%, 85% or even 90% of the entire length of the wind turbine blade. The length of the first region may constitute at least 2%, 5%, 10%, 15%, 20%, 25%, 30%, 35%, 40%, 45%, 50%, 55%, 60%, 65%, 70%, 75%, 80%, 85% or even 90% of the entire length of the blade. The length of the second region may constitute at least 2%, 5%, 10%, 15%, 20%, 25%, 30%, 35%, 40%, 45%, 50%, 55%, 60%, 65%, 70%, 75%, 80%, 85% or even 90% of the entire length of the blade. Preferably, the first region, the sec- and region and the transition region constitute at least 5%, 10%, 15%, 20%, 25%, 30%, 35%, 40%, 45%, 50%, 55%, 60%, 65%, 70%, 75%, 80%, 85%, 90%, 95% or more preferably, 100% of the entire length of the wind turbine blade.

In another embodiment according to the invention, the polymer matrix is a resin, such as polyester or epoxy. The polymer matrix is preferably a resin. The resin may be a thermosetting resin, such as epoxy, vinylester or polyester, or a thermoplastic resin, such as nylon, PVC, ABS, polypropylene or polyethylene.

However, the resin may comprise an in situ polymerisable thermoplastic material. Advantageously, the in situ polymerisable thermoplastic material may be selected from the group consisting of pre-polymers of: Polybutylene terephthalate (PBT), polyamide-6 (pre-polymer is caprolactam), polyamide-12 (pre-polymer is laurolactam) alloys of poly-amide-6 and polyamide-12; polyurethanes (TPU), polymethylmethacrylate (PMMA), polyethylene terephthalate (PET), polycarbonate (PC), polyetheretherketone (PEEK), polyetherketone (PEK), polyethersulfone (PES), polyphenylenesulphide (PPS), poly-ethylenenaphthalate (PEN) and polybutylenenaphthalate (PBN), cyclic poly(1, 4-butylene terephthalate) (CBT) and/or combinations thereof.

The in situ polymerisable thermoplastic material has the advantage that it may be handled in its pre-polymer state and may be handled as a liquid, a powder or pellets. Accordingly, the material may be used for pre-impregnating the reinforcement fibre material, i.e. in a pre-preg. Alternatively, it may be sprayed on in powder form onto the reinforcement fibre material or be arranged in the mould parts as separate layers.

In situ polymerisable thermoplastic material, such as CBT, has the advantage that it does not obtain a water-like viscosity when heated to a temperature of approximately 150° Celsius. Thereby, it is possible to quickly impregnate the reinforcement fibre material of very large composite structures to be moulded and subsequently curing the resin in very short cycle times.

CTB is available as one-part systems, where a catalyst is premixed into the resin, and where the catalyst is activated for instance by heating, and as two-part systems, where the catalyst and resin are kept separately until immediately before use.

In some situations, it may be advantageous to draw in additional in situ polymerisable thermoplastic material in order to impregnate the entire reinforcement fibre material. In such situation, it may be advantageous to use one-part systems for the pre-supplied resin and two-part systems for the additional resin.

The term polymerisable thermoplastic material means that the material may be polymerised at the manufacturing site.

In another embodiment according to the invention, the fibre-reinforced polymer material further comprises a third reinforcement fibre material.

The third reinforcement fibre material may be comprised in the first region, the second region or the transition region or in any combination thereof. Preferably, the third reinforcement fibre material is glass and/or carbon. Preferably, the third reinforcement fibre material has material properties, e.g. Young's modulus or elongation of breakage, between the corresponding properties for the first and the second reinforcement-material, whereby the third reinforcement fibre material may be used to smooth/level out differences in the material properties. The third reinforcement fibre material comprises a maximum of 50%, 40%, 30%, 20%, 10%, 5% or even 0% by volume or by mass of the total fibre reinforcement in the first region, the second or the transitional region or any combination thereof.

In a further embodiment, the third reinforcement fibre material is contained in the transition region, and the amount of the third reinforcement fibre material in the transition region changes preferably gradually from the first to the second region.

In another embodiment according to the invention, the wind turbine blade has a length of at least 40 meters. The wind turbine blade may also have a length of at least 45, 50, 55, 60 or 70 meters.

The blade advantageously comprises bushings that are laminated into the composite structure of the blade root and that can be used to attach the blade root to a hub of a wind turbine.

BRIEF DESCRIPTION OF THE DRAWINGS

The invention is explained in detail below with reference to an embodiment shown in the drawings, in which.

DETAILED DESCRIPTION OF THE INVENTION

Figure 1:
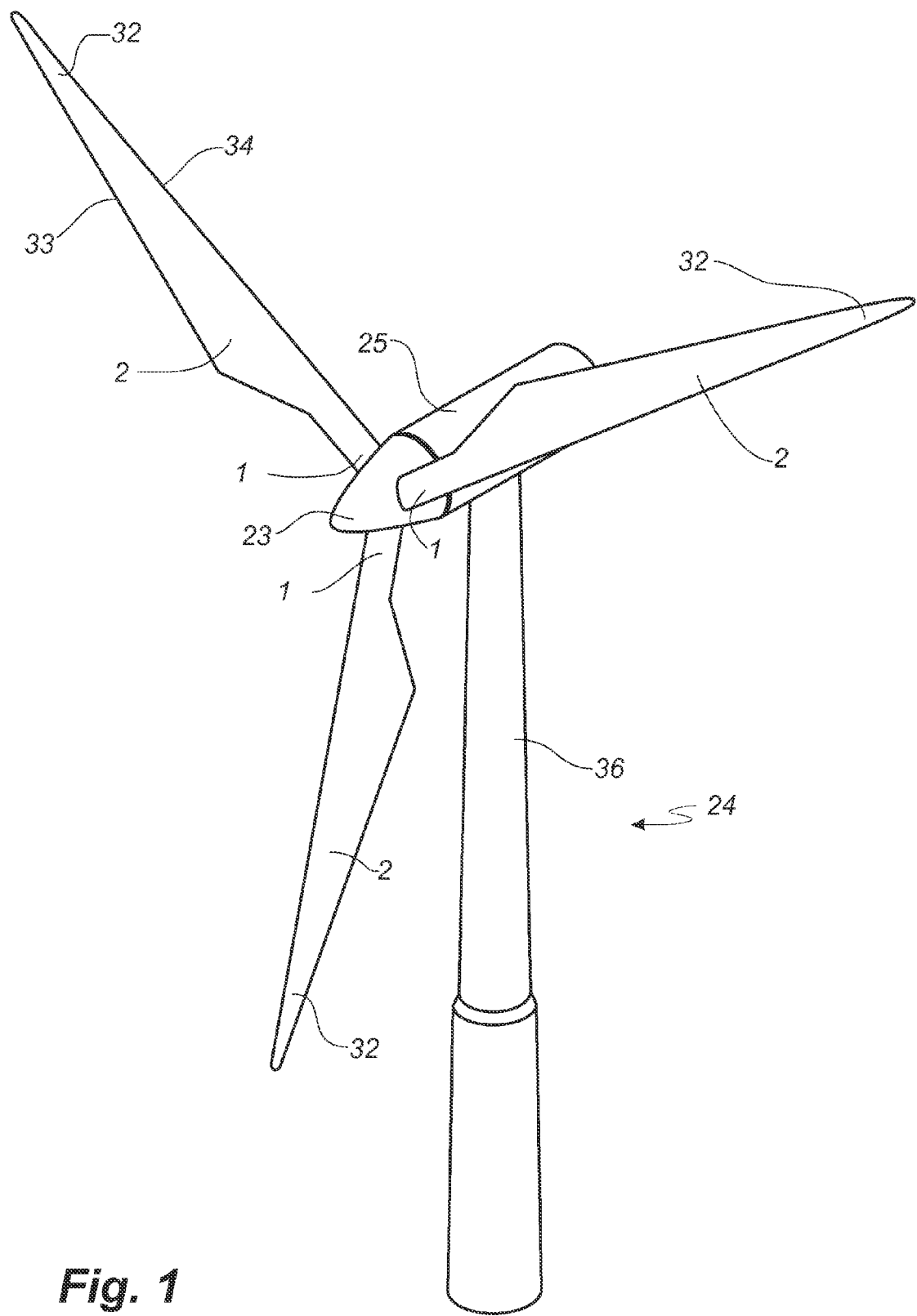
FIG. 1 shows a wind turbine.

FIG. 1 illustrates a conventional, modern upwind wind turbine 24 according to the so-called "Danish concept" with a tower 36, a nacelle 25 and a rotor with a substantially horizontal rotor shaft. The rotor includes a hub 23 and three wind turbine blades 2 extending radially from the hub 23, each having a wind turbine blade root 1 nearest the hub 23 and a wind turbine blade tip 32 furthest from the hub 23.

Figure 2:
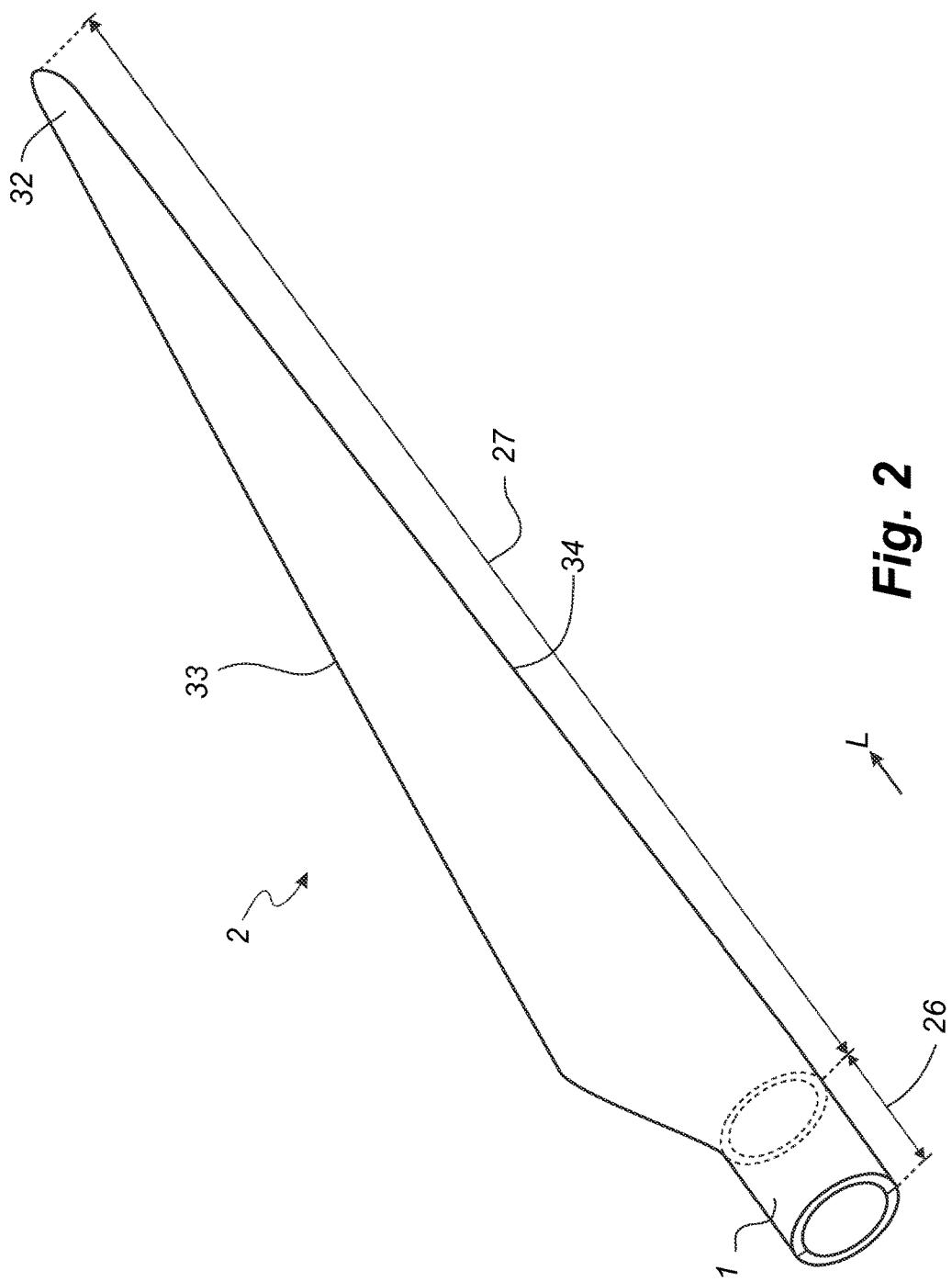
FIG. 2 shows a perspective view of a wind turbine blade.

As seen in FIG. 2, the wind turbine blade 2 comprises a root region 26 with a substantially circular profile closest to the hub and a blade region 27 with a lift-generating profile furthest away from the hub. The lift-generating profile is provided with a suction side and a pressure side as well as a leading edge 34 and a trailing edge 33. The blade region 27 has an ideal or almost ideal blade shape, whereas the root region 26 has a substantially circular cross section. The blade region 27 has an airfoil profile with a chord plane extending between the leading edge 34 and the trailing edge 33 of the wind turbine blade 2. The width of the chord plane decreases with increasing distance L from the root region 26. It should be noted that the entire extent of the chord plane is not necessarily straight as the wind turbine blade 2 may be twisted and/or curved, thus providing a chord plane with a correspondingly twisted and/or curved course. The wind turbine blade 2 is formed in a fibre-reinforced polymer material comprising a polymer matrix and a first and a second and optionally a third reinforcement fibre material embedded in the polymer matrix, wherein the first reinforcement fibre material in the root region 26 is predominantly metal, such as steel fibres.

The wind turbine blade 2 is manufactured by bonding two shell parts together along a bonding region substantially following a chord plane between the leading edge 34 and the trailing edge 33 of the wind turbine blade 2 such that each of the shell parts represents substantially either the pressure side or the suction side. The bonding region extends throughout the root region 26 and the blade region 27. However, the wind turbine blade may also be manufactured in a single shell part not requiring a bonding region by so-called hollow moulding.

Figure 3:
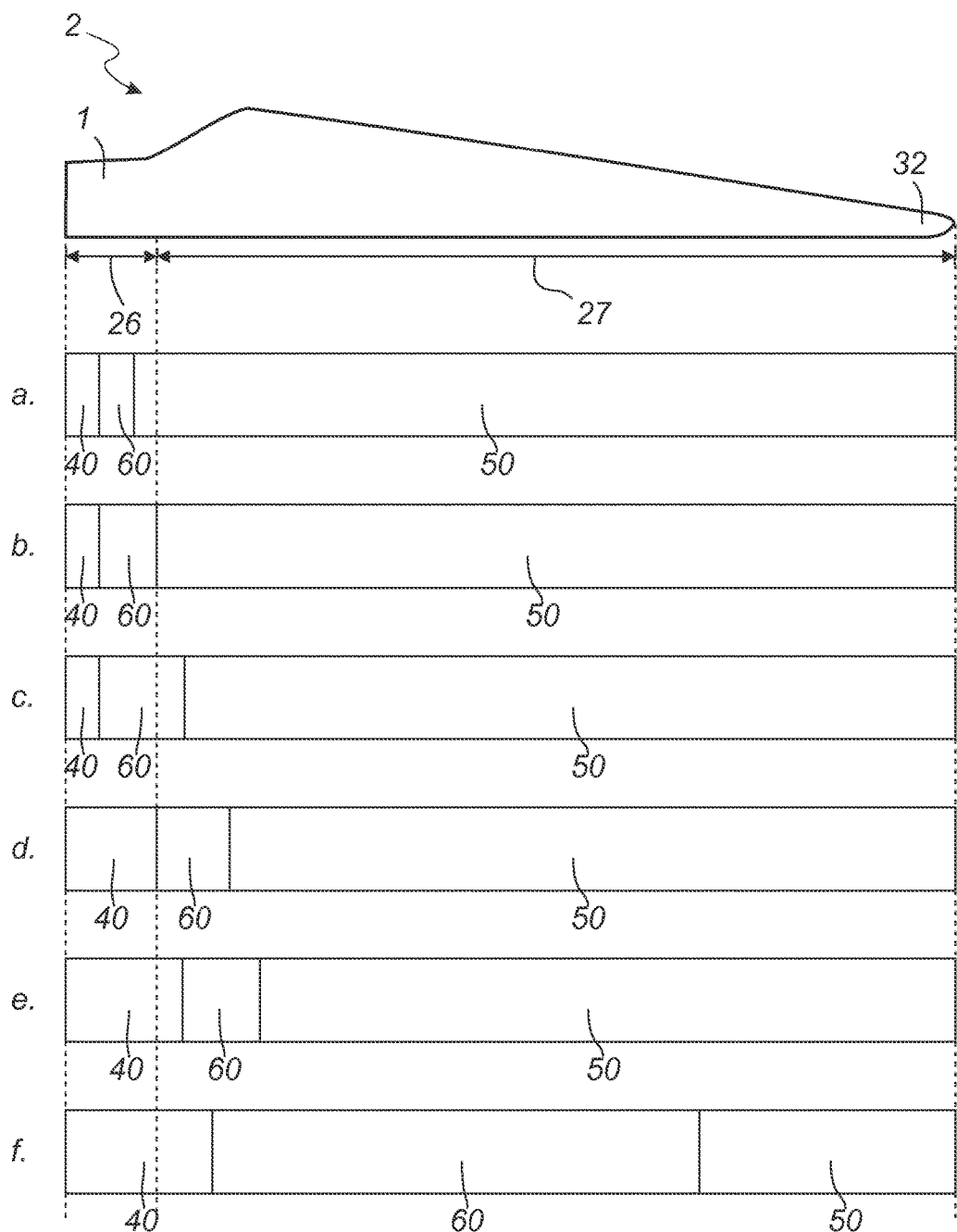
FIG. 3 shows different embodiments in relation to the location of the first region, the second region and the transition region seen perpendicularly to the longitudinal direction of the wind turbine blade.

FIG. 3 illustrates a wind turbine blade 2 having a root region 26 at the blade root 1, the root region 26 having a substantially circular profile, and a blade region 27 extending from the blade tip 32. The wind turbine blade 2 is formed of a fibre-reinforced polymer material comprising a polymer matrix and a first and a second reinforcement fibre material being embedded in the polymer matrix. The wind turbine blade 2 comprises a first region 40, a second region 50 and a transition region 60 between the first region 40 and the second region 50. The first region 40, the second region 50 and the transition region 60 extend in the longitudinal direction of the wind turbine blade. The first region 40 is reinforced predominantly with the first reinforcement fibre material, and the second region 50 is reinforced predominantly with the second reinforcement fibre material. The first and the second reinforcement fibre material are different materials from each other having different E-modulus and material properties such as stiffness and elongation at breakage. In all embodiments, the first reinforcement fibre material is or comprises preferably metal and even more preferably steel. The transition region 60 has a gradually changing distribution of the first and the second reinforcement fibre material in the longitudinal direction as further illustrated in FIG. 4.

FIG. 3 illustrates six different embodiments, a., b., c., d., e., and f, respectively, in respect to the location of the first region 40, the second region 50 and the transition region 60.

In the first embodiment a., the first region 40 and the transition region 60 extend fully in the root region 26, while the second region 50 extends partially in the root region 26, but extends predominantly in the blade region 27. The first region 40 extends from the end of the blade root 1 of the wind turbine blade 2, and the second region 50 extends from the end of the blade tip 32.

In the second embodiment b., the first region 40 and the transition region 60 extend fully in the root region 26, while the second region 50 extends fully in the blade region 27. The interface between the transition region 60 and the second region 50 coincides within the interface between the root region 26 and the blade region 27. The first region 40 extends from the end of the blade root 1 of the wind turbine blade 2, and the second region 50 extends from the end of the blade tip 32.

In the third embodiment c., the first region 40 extends fully in the root region 26, while the transition region 60 extends partially in the root region 26 and the blade region 27. The second region 50 extends fully in the blade region 27. The first region 40 extends from the end of the blade root 1 of the wind turbine blade 2, and the second region 50 extends from the end of the blade tip 32.

In the fourth embodiment d., the first region 40 extends fully in the root region 26, while the transition region 60 and the second region 50 extend fully in the blade region 27. The interface between the transition region 60 and the first region 40 coincides within the interface between the root region 26 and the blade region 27. The first region 40 extends from the end of the blade root 1 of the wind turbine blade 2, and the second region 50 extends from the end of the blade tip 32.

In the fifth and sixth embodiment e. and f., the first region 40 extends fully in the root region 26 and partially in the blade region 27, while the transition region 60 and the second region 50 extend fully in the blade region 27. The first region 40 extends from the end of the blade root 1 of the wind turbine blade 2, and the second region 50 extends from the end of the blade tip 32.

Even though it is shown in all embodiments that the first region 40 extends from the end of the blade root 1 of the wind turbine blade 2 and that the second region extends from the end of the blade tip 32, alternative embodiments, where the first region 40 does not extend from the end of blade root 1 of the wind turbine blade 2 and/or where the second region 50 does not extend from the end of the blade tip 32, are also possible embodiments according to the invention.

Figure 4:
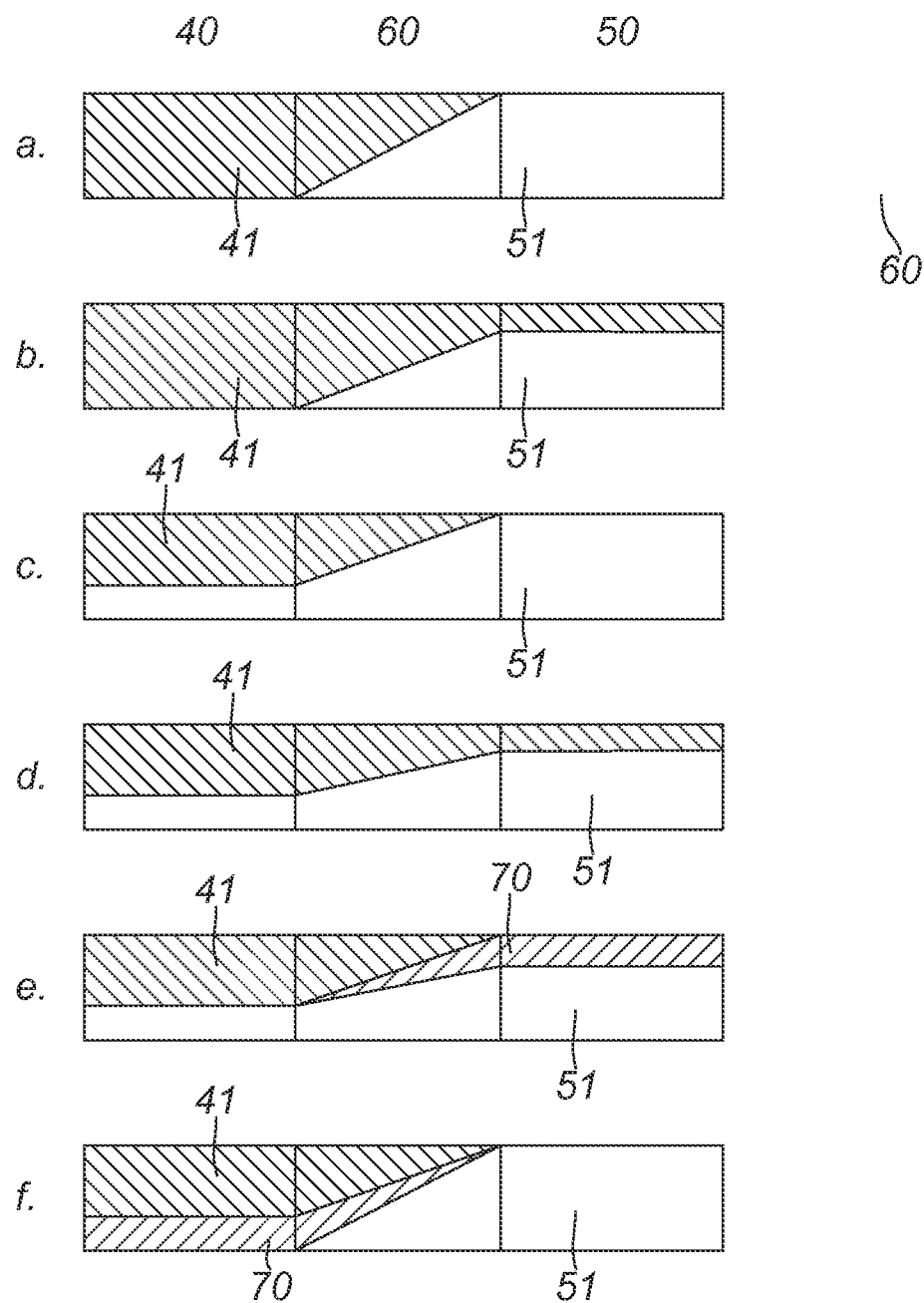
FIG. 4 shows different embodiments in relation to the distribution of the first, second and third reinforcement fibre material seen perpendicularly to the longitudinal direction of the blade.

FIG. 4 is a diagrammatic view of six different embodiments, a., b., c., d., e. and f., in relation to the distribution or quantitative ratio of the first 41, second 51 and third reinforcement fibre material 70 in the first region 40, the second region 50 and the transition region 60. Each of these embodiments can be applied in combination with the six embodiments illustrated in FIG. 3, thus resulting in 36 embodiments in combination.

In the first embodiment, a. in FIG. 4, the first region 40 contains solely the first reinforcement fibre material 41 as the reinforcement fibre material and the second region 50 contain solely the second reinforcement fibre material 51 as the reinforcement fibre material, while the transition region 60 contains both the first reinforcement fibre material 41 and the second reinforcement fibre material 51 in a distribution or quantitative ratio gradually changing in a constant/linear manner. Thus, a smooth transition is provided from the first reinforcement fibre material 41 in the first region 40 to the second reinforcement fibre material 51 in the second region 50.

In the second embodiment, b. in FIG. 4, the first region 40 contains solely the first reinforcement fibre material 41 as the reinforcement fibre material and the second region 50 contain a mixture of the first 41 and the second reinforcement fibre material 51, where the amount of the second reinforcement fibre material 51 is predominant. The transition region 60 contains both the first reinforcement fibre material 41 and the second reinforcement fibre material 51 in a distribution or quantitative ratio changing gradually in a constant/linear manner. Thus, a smooth transition is provided from the first reinforcement fibre material 41 in the first region 40 to the mixture of the first 41 and the second reinforcement fibre material 51 in the second region 50 with a predominant amount of the second reinforcement fibre material 51.

In the third embodiment, c. in FIG. 4, the first region 40 contains a mixture of the first reinforcement fibre material 41 and the second reinforcement fibre material 51 with a predominant amount of the first reinforcement fibre material 41. The second region 50 contains solely the second reinforcement fibre material 51, and the transition region 60 contains both the first reinforcement fibre material 41 and the second reinforcement fibre material 51 in a distribution or quantitative ratio changing gradually in a constant/linear manner. Thus, a smooth transition is provided from the mixture of the first 41 and the second reinforcement fibre material 51 in the first region 40, with a predominant amount of the first reinforcement fibre material 41, to the second reinforcement fibre material 51 in the second region 50.

In the fourth embodiment, d. in FIG. 4, both the first region 40 and the second region 50 contain a mixture of the first reinforcement fibre material 41 and the second reinforcement fibre material 51, but with a predominant amount of the first reinforcement fibre material 41 and the second reinforcement fibre material 51, respectively. The transition region 60 contains both the first reinforcement fibre material 41 and the second reinforcement fibre material 51 in a distribution or quantitative ratio changing gradually in a constant/linear manner. Thus, a smooth transition is provided from the mixture of the first 41 and the second reinforcement fibre material 51 in the first region 40 to the mixture of the first 41 and the second reinforcement fibre material 51 in the second region 40.

In the fifth embodiment, e. in FIG. 4, the first region 40 contains a mixture of the first reinforcement fibre material 41 and the second reinforcement fibre material 51, while the second region 50 contains a mixture of the second reinforcement fibre 51 and a third reinforcement fibre material 70, but with a predominant amount of the second reinforcement fibre material 41. The transition region 60 contains the first 41, the second 51 and the third reinforcement fibre material 70 in a distribution or quantitative ratio changing gradually in a constant/linear manner. Thus, a smooth transition is provided from the mixture of the first 41 and the second reinforcement fibre material 51 in the first region 40 to the mixture of the second 51 and the third second reinforcement fibre material 70 in the second region 40. Preferably, the third reinforcement fibre material 70 is a material having an E-modulus between the E-modulus of the first 41 and the second reinforcement fibre material 51 such that a smooth transition of material properties is obtained.

In the sixth embodiment, f. in FIG. 4, the first region 40 contains a mixture of the first reinforcement fibre material 41 and the third reinforcement fibre material 70, but with a predominant amount of the first reinforcement fibre material 41, while the second region 50 contains solely the second reinforcement fibre 51. The transition region 60 contains the first 41, the second 51 and the third reinforcement fibre material 70 in a distribution or quantitative ratio changing gradually in a constant/linear manner. Thus, a smooth transition is provided from the mixture of the first 41 and the third reinforcement fibre material 70 in the first region 40 to the second reinforcement fibre material 51 in the second region 50. Preferably, the third reinforcement fibre material 70 is a material having an E-modulus between the E-modulus of the first 41 and the second reinforcement fibre material 51 so that a smooth transition in material properties is obtained, especially in relation to flexibility.

In the above embodiments the distributions or quantitative ratios are changing gradually in a linear/constant manner, but the distributions or quantitative ratios may also change step-wise or in an exponential manner or in any other manner that provides a smooth transition. Preferably, the first 41, the second 51 and the third reinforcement fibre material 70 in the above embodiments are/comprise steel, glass and carbon, respectively. Thus, as seen in FIG. 4, the reinforcement fibre of the root region can be formed in steel, a mixture of steel and glass or a mixture of steel and carbon, while the blade region can be formed in glass or in a mixture of glass and carbon.

The examples have been described according to preferred embodiments. However, the invention is not limited to these embodiments. Thus the first 41, the second 51 and the third reinforcement fibre material may also be present in mixtures in any combination of the first 40, the second 50 and the transition region 60.

LIST OF REFERENCES

1 Blade root
2 Wind turbine blade
10 First shell part
15 Second shell part
23 Hub
24 Wind turbine
25 Nacelle
26 Root region
27 Blade region
29 Root end surface
32 Blade tip
33 Trailing edge
34 Leading edge
36 Tower
40 First region
41 First reinforcement fibre material
50 Second region
51 Second reinforcement fibre material
60 Transition region
70 Third reinforcement fibre material

The invention claimed is:

1. A wind turbine blade (2) for a rotor having a substantially horizontal rotor shaft, the rotor comprising a hub (23) from which the wind turbine blade (2) extends substantially in a radial direction when mounted to the hub (23), the wind turbine blade (2) having a longitudinal direction extending from a root region (26) to a blade region, the root (26) and the blade region, respectively, being closest to and furthest away from the hub (23) when the wind turbine blade (2) is mounted to the hub, the root region (26) having a substantially circular profile, the wind turbine blade (2) being formed of a fibre-reinforced polymer material comprising a polymer matrix and a first and a second reinforcement fibre material being embedded in the polymer matrix, the wind turbine blade further comprising a first region, a second region and a transition region between the first and the second region, the first region, the second region and the transition region extending in the longitudinal direction, the first region being predominantly reinforced with the first reinforcement fibre material, the second region being predominantly reinforced with the second reinforcement fibre material, the first and the second reinforcement fibre material being different from each other having different E-modulus and material properties, the transition region having a gradually changing distribution of the first and the second reinforcement fibre material in the longitudinal direction, characterised in that the first region extends in the root region (26) and in that the first reinforcement fibre material is a metal,
wherein the first region extends fully in the root region (26).

2. The wind turbine blade (2) according to claim 1, wherein the transition region extends in the root region (26).

3. The wind turbine blade (2) according to claim 1, wherein the transition region extends fully in the root region (26).

4. The wind turbine blade (2) according to claim 1, wherein the second region extends in the root region (26).

5. The wind turbine blade (2) according to claim 1, wherein the first reinforcement fibre material is steel.

6. The wind turbine blade (2) according to claim 1, wherein the second reinforcement fibre material is carbon.

7. The wind turbine blade (2) according to claim 1, wherein the second reinforcement fibre material is glass.

8. The wind turbine blade (2) according to claim 1, wherein the fibres of the first reinforcement fibre material extend predominantly in the longitudinal direction.

9. The wind turbine blade (2) according to claim 1, wherein the transition region extends at least half a meter in the longitudinal direction.

10. The wind turbine blade (2) according to claim 1, wherein the polymer matrix is a resin.

11. The wind turbine blade (2) according to claim 1, wherein the fibre-reinforced polymer material further comprises a third reinforcement fibre material.

12. The wind turbine blade (2) according to claim 11, wherein the third reinforcement fibre material is contained in the transition region, and the amount of the third reinforcement fibre material in the transition region changes gradually from the first to the second region.

13. The wind turbine blade (2) according to claim 1, wherein the wind turbine blade (2) has a length of at least 40 meters.

14. The wind turbine blade (2) according to claim 1, wherein the material properties comprise stiffness and elongation at breakage.

15. The wind turbine blade (2) according to claim 10, wherein the resin comprises polyester, epoxy, or vinyl ester.

* * * * *